Aug. 31, 1926.
A. R. EARNSHAW
LEAKAGE SEAL FOR SHAFTS
Filed August 6, 1923
1,598,564
FIG. I.
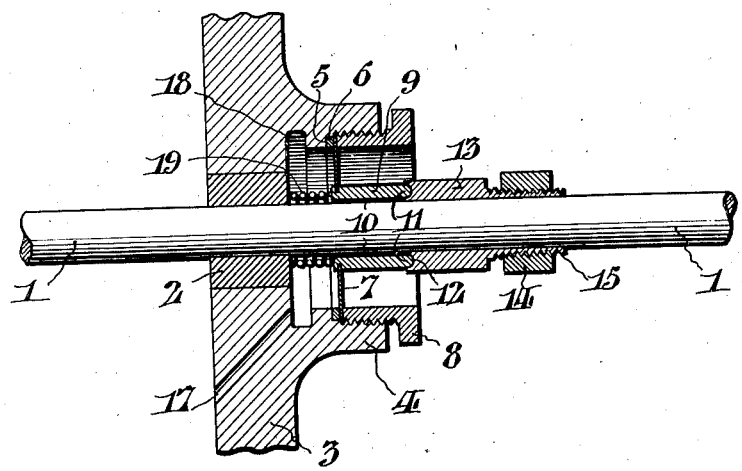
FIG. II.
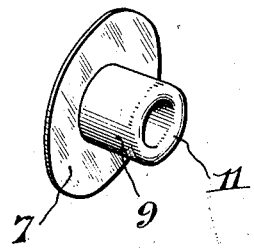
FIG. III.
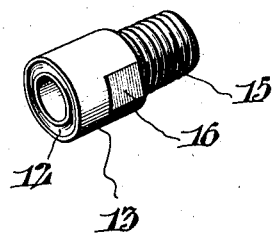
WITNESSES:
INVENTOR:
Arthur R. Earnshaw,
BY
ATTORNEYS.

Patented Aug. 31, 1926.

1,598,564

UNITED STATES PATENT OFFICE.

ARTHUR R. EARNSHAW, OF WYNNEWOOD, PENNSYLVANIA, ASSIGNOR TO EARNSHAW MANUFACTURING CORPORATION, OF PHILADELPHIA, PENNSYLVANIA, A CORPORATION OF DELAWARE.

LEAKAGE SEAL FOR SHAFTS.

Application filed August 6, 1923. Serial No. 655,904.

My invention relates to means useful in rendering journals for shafts of compressors, pumps and the like proof against fluid leakage and is directed toward provision of a metallic packing for the purpose indicated, characterized by the absence of stuffing such as ordinarily employed in securing fluid-tightness and capable of maintaining a perfect and reliable seal notwithstanding lateral displacement of the shaft as is likely to occur under vibratory flexure at high speeds of rotation.

How this desiderata may be attained will become readily apparent from the detailed description which follows of a typical embodiment of my invention.

In the drawings, Fig. I, is a fragmentary detail sectional view of a shaft journal conveniently showing my invention incorporated therewith.

Figs. II and III are perspective illustrations of the two elements comprised in my invention, which cooperate to maintain a fluid tight seal at the shaft journal.

As herein shown, the shaft 1 that is to be packed is journalled in a replaceable bushing bearing 2 appropriately secured in the casing wall of a compressor or pump whereof a portion is indicated at 3. From the exterior of this wall 3 projects a boss 4 having an axial cavity with a shoulder 5 that affords a seat for a packing gasket 6 against which rests a comparatively thin metallic diaphragm or vibratory disk 7. The circumferential margin of this diaphragm 7 is forced into fluid-tight engagement with the packing gasket 6 by a gland 8 screwed into the boss 4. The diaphragm 7 has an extended outwardly-projecting axial sleeve 9 that surrounds the shaft 1, but with interposition of an annular interspace as indicated conventionally by the shading at 10 in Fig. I, so as to be capable of independent lateral yielding movement under the flexibility of the diaphragm 7. The free end of the sleeve 9, (see Fig. II), has a rounded cross-sectional configuration as at 11 to fit snugly within a correspondingly configured annular groove 12 (Figs. I, and III), in the contiguous end face of a collar 13 that is detachably secured to the shaft 1. Any appropriate means may be employed to secure the collar 13 such for example as herein shown in the form of a nut 14 designed to engage with a reduced integral tapered threaded axial prolongation 15 of said collar 13. In practice I have found that if the wall of the tapered prolongation 15 is made relatively thin, a reliable binding effect may be had through co-operation of the nut 14 without necessitating splitting of said prolongation. In order to permit the use of a suitable tool to hold the collar 13 against rotation as the nut 14 is applied, I flatten the body portion of the collar at diametrically opposite sides as shown at 16 in Fig. III. The diaphragm 7 is subject to pressure influence from the interior of the casing 3 through provision of one or more communication ducts 17 that lead to an internal annular recess 18 in the hollow of the boss 4. If desired such pressure influence may be augmented by means of a helical spring 19 in compression in the interval between the bushing 2 and the inner end of the sleeve 9.

In operation, the pressure exerted upon the inner face of the diaphragm 7 under assistance of the spring 19 serves to maintain the free end 11 of the sleeve 9 firmly seated in the groove 12 of the rotating collar 13 and thereby establishes a perfect fluid-tight joint at this region. Such engagement by reason of the interlock between the outer end of the sleeve 9 and the contiguous face of the collar 13 will obviously be maintained notwithstanding any lateral displacement of said collar under vibratory flexure of the shaft 1 at high speeds, the sleeve 9 adapting itself readily at all times to compensate positional changes by virtue of the flexibility of the diaphgram 7. It is important to note in this connection that the sleeve 9 is purposely made of such length as to insure its freedom of movement without undue strain upon the diaphragm 7 at the region of its attachment to the latter.

Furthermore, it is especially noteworthy in connection with this invention that I have provided a shaft packing which automatically compensates for wear at the joint while remaining at all times hermetically sealed. This feature inheres from the pliable nature of the diaphragm 7, that allows the sleeve 9 to move and compensate for any wear arising between its free end 11 and the complementary surface of the groove 12.

The inherent simplicity of my invention, it will be seen, offsets the possibility of derangement or necessity for frequent adjustment in use, and it will also be apparent that its longevity will greatly excel shaft packings wherein stuffings are relied upon to secure fluid-tightness.

Having thus described my invention, I claim:

1. In a leakage seal for shafts comprising a pressure influenced diaphragm having an axial sleeve adapted to fit loosely about the shaft to be sealed, the combination of a collar having a screw-threaded taper prolongation and co-operative nut by which it is fixed to the shaft, said collar having an annularly grooved end with which the complementarily configured contiguous end of the sleeve co-operates hermetically, while accommodating vibratory flexure of the shaft.

2. In a leakage seal for shafts comprising a pressure influenced diaphragm having an extended axial sleeve adapted to fit freely about the shaft to be sealed, the combination of a collar having a screw-threaded taper prolongation and co-operative nut by which it is fixed on the shaft, said collar having an annularly grooved end in co-operative abutment with the contiguous end of the sleeve to afford a hermetical seal and accommodate vibratory flexure of the shaft.

In testimony whereof, I have hereunto signed my name at Philadelphia, Pennsylvania, this 3rd day of August, 1923.

ARTHUR R. EARNSHAW.